United States Patent
Jiang

(10) Patent No.: US 7,402,183 B1
(45) Date of Patent: Jul. 22, 2008

(54) HIGH CAPACITANCE CATHODE FOIL PRODUCED BY ABRASION PROCESS USING TITANIUM NITRIDE POWDER

(75) Inventor: Xiaofei Jiang, Liberty, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 247 days.

(21) Appl. No.: 11/458,563

(22) Filed: Jul. 19, 2006

(51) Int. Cl.
 *H01G 9/00* (2006.01)
(52) U.S. Cl. ............... 29/25.03; 438/239; 438/250; 438/253; 438/393; 438/396; 257/E21.008
(58) Field of Classification Search ............. 361/526, 361/529, 534–536
See application file for complete search history.

(56) References Cited

U.S. PATENT DOCUMENTS

| | | | |
|---|---|---|---|
| 5,609,157 | A | 3/1997 | Panescu et al. |
| 5,630,425 | A | 5/1997 | Panescu et al. |
| 5,779,645 | A | 7/1998 | Olson et al. |
| 6,687,118 | B1 * | 2/2004 | O'Phelan et al. ............ 361/508 |
| 6,754,530 | B2 | 6/2004 | Bakels et al. |
| 7,010,347 | B2 | 3/2006 | Schecter |
| 7,082,329 | B2 | 7/2006 | Jarverud |
| 2004/0114311 | A1 | 6/2004 | O'Phelan et al. |
| 2005/0131509 | A1 | 6/2005 | Atanassoska et al. |

FOREIGN PATENT DOCUMENTS

| | | |
|---|---|---|
| EP | 0344316 A1 | 2/1989 |
| EP | 0344316 B1 | 2/1989 |
| EP | 0344316 A1 | 6/1989 |
| EP | 0344316 A4 | 6/1989 |
| EP | 1538979 B1 | 3/2006 |

* cited by examiner

*Primary Examiner*—Walter L. Lindsay, Jr.
*Assistant Examiner*—Kyoung Lee
(74) *Attorney, Agent, or Firm*—Steven M. Mitchell

(57) ABSTRACT

A dry titanium nitride (TiN) powder abrasion method roughens the surface of a valve metal foil for use as a cathode in an electrolytic capacitor. This increases the surface area of the foil, thereby increasing the double-layer capacitance of the cathode, and also mechanically alloys TiN powder to the surface of the foil, thereby increasing the pseudo-capacitance of the cathode. In one embodiment, a piece of thin titanium foil is mounted on a hard metal backing and at least one surface of the foil is abraded with fine titanium nitride powder. In another embodiment, a continuous metal foil tape is fed into a bead blasting box and at least one surface of the metal foil tape is abraded with TiN powder delivered by a bead blasting nozzle located within the bead blasting box. Accordingly, a cathode having increased capacitance capability is provided to more closely match the capacitance of a poly-anode stack.

20 Claims, 2 Drawing Sheets

HIGH CAPACITANCE CATHODE FOIL PRODUCED BY ABRASION PROCESS USING TITANIUM NITRIDE POWDER

BACKGROUND OF THE INVENTION

1. Field of the Invention

The present invention relates to a method for abrading electrodes with titanium nitride powder for use as cathode electrodes of electrolytic capacitors, thereby increasing the capacitance of the cathode foil to more closely match the capacitance of a poly-anode stack.

2. Related Art

Compact, high voltage capacitors are utilized as energy storage reservoirs in many applications, including implantable medical devices. These capacitors are required to have a high energy density since it is desirable to minimize the overall size of the implanted device. This is particularly true of an Implantable Cardioverter Defibrillator (ICD), also referred to as an implantable defibrillator, since the high voltage capacitors used to deliver the defibrillation pulse can occupy as much as one third of the ICD volume.

Implantable Cardioverter Defibrillators, such as those disclosed in U.S. Pat. No. 5,131,388, incorporated herein by reference, typically use two electrolytic capacitors in series to achieve the desired high voltage for shock delivery. For example, an ICD may utilize two 350 to 400 volt electrolytic capacitors in series to achieve a voltage of 700 to 800 volts.

Electrolytic capacitors are used in ICDs because they have the most nearly ideal properties in terms of size, reliability and ability to withstand relatively high voltage. Conventionally, such electrolytic capacitors typically consist of a cathode electrode, an electrically conductive electrolyte and a porous anode with a dielectric oxide film formed thereon. While aluminum is the preferred metal for the anode plates, other metals such as tantalum, magnesium, titanium, niobium, zirconium and zinc may be used. A typical electrolyte may be a mixture of a weak acid and a salt of a weak acid, preferably a salt of the weak acid employed, in a polyhydroxy alcohol solvent. The electrolytic or ion-producing component of the electrolyte is the salt that is dissolved in the solvent. The entire laminate is rolled up into the form of a substantially cylindrical body, or wound roll, that is held together with adhesive tape and is encased, with the aid of suitable insulation, in an aluminum tube or canister. Connections to the anode and the cathode are made via tabs. Alternative flat constructions for aluminum electrolytic capacitors are also known, comprising a planar, layered, stack structure of electrode materials with separators interposed therebetween, such as those disclosed in the above-mentioned U.S. Pat. No. 5,131,388.

The need for high voltage, high energy density capacitors is most pronounced when employed in ICDs. In ICDs, as in other applications where space is a critical design element, it is desirable to use capacitors with the greatest possible capacitance per unit volume. Since the capacitance of an electrolytic capacitor is provided by the anodes, a clear strategy for increasing the energy density in the capacitor is to minimize the volume taken up by paper and cathode and maximize the number of anodes. A multiple anode flat, stacked capacitor configuration requires fewer cathodes and paper spacers than a single anode configuration and thus reduces the size of the device. A multiple anode stack consists of a number of units consisting of a cathode, a paper spacer, two or more anodes, a paper spacer and a cathode, with neighboring units sharing the cathode between them. In order to achieve higher energy densities, it has been necessary to stack up to seven anodes per layer. However, due to the higher capacitance values achieved with multiple anodes, traditional chemically etched aluminum cathodes provide insufficient capacitance coverage at the desired thickness of 30 microns or less.

Known high capacitance cathode technologies present significant problems. Etched aluminum cathodes are technologically limited and can not support the high capacitance required when more than two anodes are placed adjacent to each other in a capacitor stack. Coated cathodes are difficult to obtain commercially and reliably. Also, known methods of titanium nitride coating are expensive. Metal oxides are difficult to coat in high purity without chloride contamination. Conductive polymers have exhibited stability issues under certain loads and uses. Therefore, there is a need for a cathode that provides suitable coverage to allow for a multiple anode stacked capacitor configuration with maximum energy output.

SUMMARY OF THE INVENTION

One embodiment of the present invention is a method for preparing a metal foil for use as a cathode in an electrolytic capacitor, comprising the step of abrading at least one surface of the metal foil with titanium nitride powder, wherein a portion of the titanium nitride powder mechanically alloys with the at least one surface of the metal foil.

Another embodiment of the present invention is a method for preparing a continuous metal foil tape for use as a cathode in an electrolytic capacitor, comprising the steps of feeding the metal foil tape into a bead blasting box; and abrading at least one surface of the metal foil tape with titanium nitride powder delivered from a bead blasting nozzle located within the bead blasting box, wherein a portion of the titanium nitride powder mechanically alloys with the at least one surface of the metal foil.

Another embodiment of the present invention is a method of assembling a flat electrolytic capacitor, comprising the steps of abrading at least one surface of a metal cathode foil with titanium nitride powder, wherein a portion of the titanium nitride powder mechanically alloys with the at least one surface of the metal cathode foil; interleaving the abraded metal cathode foil with a separator material and a poly-anode stack such that a multiple anode stacked capacitor configuration is formed, wherein the separator material prevents electrical contact between the abraded metal cathode and the poly-anode stack; and impregnating the multiple anode stacked capacitor configuration with a solvent-based electrolyte.

BRIEF DESCRIPTION OF THE DRAWINGS/FIGURES

DETAILED DESCRIPTION OF THE INVENTION

Figure 1:
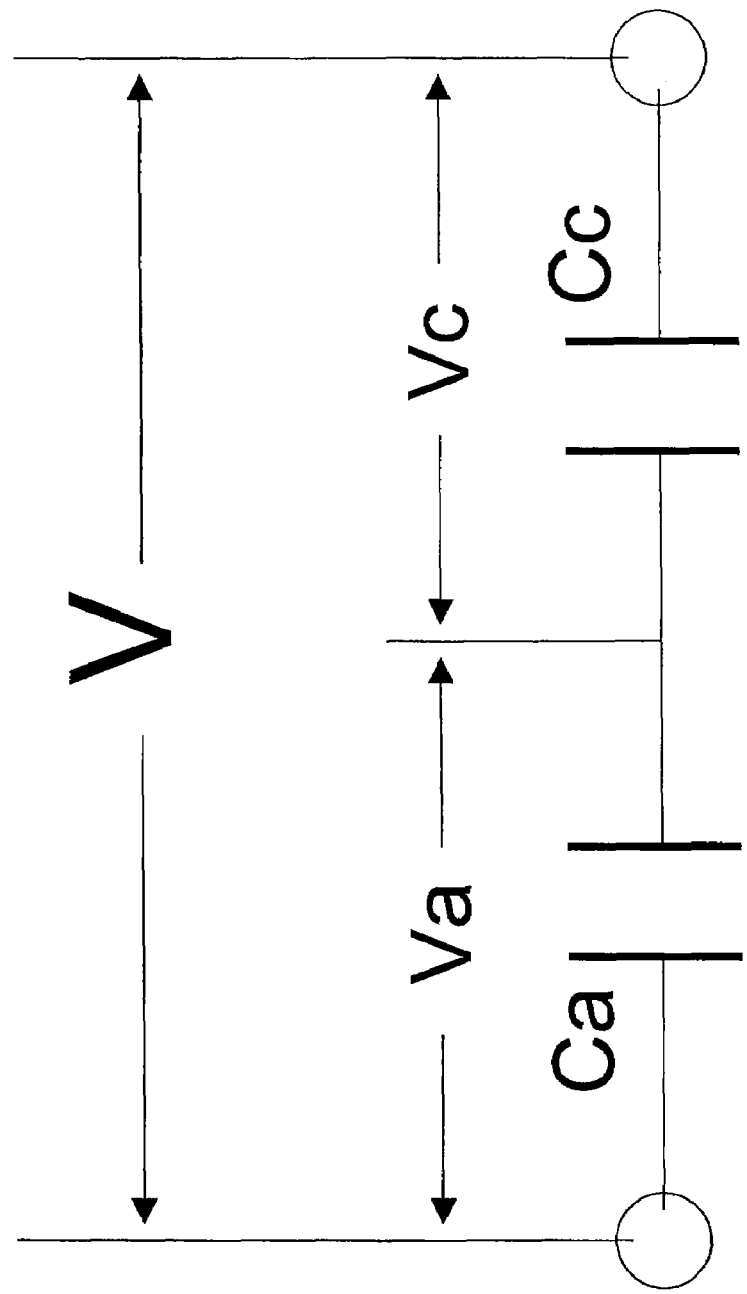
FIG. 1 depicts the voltage during discharge of an electrolytic capacitor.

The present invention relates to a method of abrading the surface of a valve metal foil, such as titanium, aluminum, niobium, silicon, or tantalum, using TiN powder to increase the capacitance of the foil for use in a poly-anode stack electrolytic capacitor. The increase in cathode capacitance will allow a poly-anode stack capacitor to enjoy a higher realized capacitance.

Preferred embodiments of the present invention are now described. While specific configurations and arrangements are discussed, it should be understood that this is done for illustrative purposes only. A person skilled in the art will recognize that other configurations and arrangements can be used without departing from the spirit and scope of the invention. It will also be apparent to a person skilled in the relevant art that this invention can be employed in a variety of other devices and applications.

It is well understood that, in order to achieve high total capacitance and maximum anode gain realization, the cathode capacitance must be nearly two orders of magnitude higher than the anode stack capacitance that is opposes. When the cathode capacitance is much larger than the anode stack capacitance, the cathode electrode maintains a negative potential. However, if the cathode capacitance is not much larger than the anode capacitance, the cathode electrode can develop a positive potential. If the cathode develops a positive potential during discharge of the capacitor, several undesirable effects can occur including oxide buildup on the cathode which reduces the capacitor performance, electrolysis that consumes electrolyte and deteriorates the performance of the capacitor with usage, and production of gaseous electrolysis byproducts that can cause swelling of the capacitor. A high capacitance cathode foil is therefore necessary to fully realize the capacitance of a poly-anode stack in an electrolytic capacitor.

Whenever an electrode is placed in contact with an electrolyte, a capacitance is developed at the interface. For an electrolytic capacitor with both the anode and cathode immersed in the fill electrolyte, the cathode acquires a capacitance in series with the anode. From the well understood formula (where Cf=Final capacitance, Ca=Anode capacitance, and Cc=Cathode capacitance):

$$Cf = \frac{Ca \cdot Cc}{Ca + Cc}$$

In order to realize 100% of the anode capacitance, the cathode capacitance must appear infinite. As this is unrealistic, the highest possible cathode capacitance is desired. Thickness is also an issue in ICDs as in other applications where space is a critical design element, so high cathode capacitance must not be achieved at the expense of an overly thick cathode. With this in mind, a 30 micron cathode with a capacitance of 170 to 200 $\mu F/cm^2$ has been employed for designs involving a dual anode configuration. For a specific anode capacitance of 2.6 $\mu F/cm^2$ for the two anodes together, a cathode capacitance of 200 $\mu F/cm^2$ leaves a realized capacitance of nearly 99% of the anode.

The advent of porous foil has allowed additional anodes to be stacked in place. With five anodes in place per layer and a conventional 30 micron cathode, the realized capacitance from the anode would be about 97%. However, there is a more insidious problem than simple capacitance loss due to the low capacitance of conventional cathodes.

In an electrolytic capacitor, the anode exhibits a dielectric capacitance capable of holding several hundred volts. The cathode exhibits a native oxide layer in series with a double layer capacitance capable of holding a maximum of approximately three volts, and typically under 1.0 volt. The anode capacitance and the cathode capacitance are in series. When a charged electrolytic capacitor pumps current through a resistive load, the anode dielectric capacitance can be visualized as discharging towards a ground potential; and the cathode double layer capacitance can be visualized as charging from a negative potential to a more positive potential.

The diagram in FIG. 1 depicts the voltage division during discharge for an anode/cathode combination. During discharge, the charge passed by the anode to the load must be equaled by the charge passed at the cathode. If this becomes unbalanced during discharge, the cathode potential will be shifted positively. If the cathode develops a positive potential, several undesirable effects can occur: (1) during a pulse discharge operation, a significant overvoltage can be fed back to the cathode, resulting in oxide buildup on the cathode which reduces the capacitor performance, (2) electrolysis can occur that consumes electrolyte and deteriorates the performance of the capacitor with usage, and (3) gaseous electrolysis byproducts can cause swelling of the capacitor.

When the capacitor is charged, positive charge accumulates on the anode foil and negative charge on the cathode foil. When held at potential for an appreciable time, the cathode will self discharge (or depolarize, in electrochemical terms) to some extent due to the fact that valve metal oxides are conductive in the reverse direction. This discharge of the cathode must involve reduction of some electrolyte species such as dissolved oxygen, depolarizer molecules, solvent or solute species or reduction of water to liberate hydrogen gas and hydroxyl/oxygen ions. It is this latter case where hydrogen is evolved that causes swelling in electrolytic capacitors undergoing repeated charge/discharge cycles.

When the capacitor is discharged quickly through an external load, electrons are attracted to the anode from the cathode through the external circuit. If the cathode capacitance-voltage (CV) product is lower than the anode CV product, insufficient charge storage capacity on the cathode results in a momentary positive bias of the cathode with respect to the electrolyte, leading to oxidation at the cathode surface. Little occurs at the anode foil surface since the field there is reduced to zero. If the metal can be oxidized easily, then anodic oxide is formed on the cathode foil as in the case of aluminum. If not, then an electrolyte component will be oxidized instead to liberate the electrons needed to reduce the electric field across the electrolyte-cathode interface to a level sustainable by the Helmholtz or double layer.

Since a reverse voltage drop at the cathode in excess of about one volt results in cathode formation and hydrogen gas production, this undesirable condition determines the condition for the minimum acceptable ratio of cathode to anode capacitance. With the advent of 4 and 5 anode per layer stacks having a capacitance of about 5 to 6 $\mu F/cm^2$, conventional aluminum or titanium cathodes are unable to provide the high capacitance needed in a 30 micron or thinner foil.

Conventionally, high capacitance cathodes are obtained by using a thin surface-area-enhanced foil with minimal oxide present. Chemical and electrochemical etch processes and deposition processes have been used to increase surface area. In addition, it is known to coat high surface area materials on to metal foil substrates, such as titanium nitride on aluminum, metal oxides on titanium, or conductive polymers on a variety of metals including aluminum and titanium. For example, the assignee of the present invention has previously used a titanium nitride (TiN) coated aluminum cathode, purchased from Becromal of America, Inc. of Clinton, Tenn. under the product name BECROMAL Kappa 30B black cathode. The TiN coating has a large surface area, so it provides high double layer capacitance. A cathode capacitance of 600 to 800 $\mu F/cm^2$ was obtainable in a 30 micron thick BECROMAL Kappa 30B black cathode foil. However, the coating process is expensive and Kappa 30B has been discontinued in the United States.

The present invention is directed to a method for treating the surface of an electrode to improve the capacitance of the cathode to match the capacitance of the poly-anode stack. According to the present invention, the surface is abraded, increasing the surface area and double-layer capacitance, and is also mechanically alloyed with titanium nitride (TiN), increasing the pseudo-capacitance of the cathode. The result is a capacitor cathode that exhibits significantly higher capacitance than a plain cathode or an etched cathode, and lower cost than a TiN coated cathode. An electrolytic capacitor including cathode electrodes of the present invention may be used in pulse discharge applications, such as ICDs, with lower discharge energy loss than an electrolytic capacitor with plain cathodes.

According to the present invention, a valve metal, such as aluminum, titanium, niobium, silicon, or tantalum, configured as a thin foil, is placed against a backing material. The primary surfaces of the foil are then abraded with a fine TiN powder. The TiN powder abrades the surface, increasing the surface area. The increased surface area improves the double-layer capacitance of the cathode. The TiN powder is also mechanically alloyed to the surface of the foil, increasing the pseudo-capacitance of the cathode. This process is less expense than using titanium nitride coated foil.

Double-layer capacitance is caused by the attraction of ions in the electrolyte to the oppositely charged electrode. The separation of the ions from the bulk of the electrolyte reduces the ease with which electrons pass through the electrolyte. In the case of an electrolytic capacitor, the positively charged ions in the electrolyte are attracted to the negatively charged cathode. The attraction is very localized to the interface of the foil with the electrolyte, so increasing the surface area of the cathode foil will increase the quantity of positively charged ions that are attracted to the interface. By increasing the quantity of ions at the interface, the quantity of ions in the bulk of the electrolyte are reduced and the double-layer capacitance is increased.

Pseudo-capacitance is created by electrochemical reactions that occur during charging and discharging of an electrolytic capacitor. The electrochemical reactions liberate additional charge that acts as a pseudo-capacitance and provides additional capacitance to the cathode. The amount of pseudo-capacitance generated in an electrolytic capacitor depends upon several factors, such as the electrode potential, the electrode material and the electrolyte compositions. The pseudo-capacitance works in conjunction with the double-layer capacitance to prevent the cathode from developing a positive potential during the discharge of an electrolytic capacitor.

Generally, the method of the present invention involves abrading the foil surface with TiN powder, by spraying the powder using compressed air for a short period of time. After spraying, a film of TiN powder will be loosely collected on the surface of the foil and is washed off. After the foil has been washed and dried, the foil is left with a rough surface that is mechanically impregnated with TiN powder. The foil can then be cut and shaped to fit as a cathode in an electrolytic capacitor, sandwiched on either side of a poly-anode stack.

Figure 2:
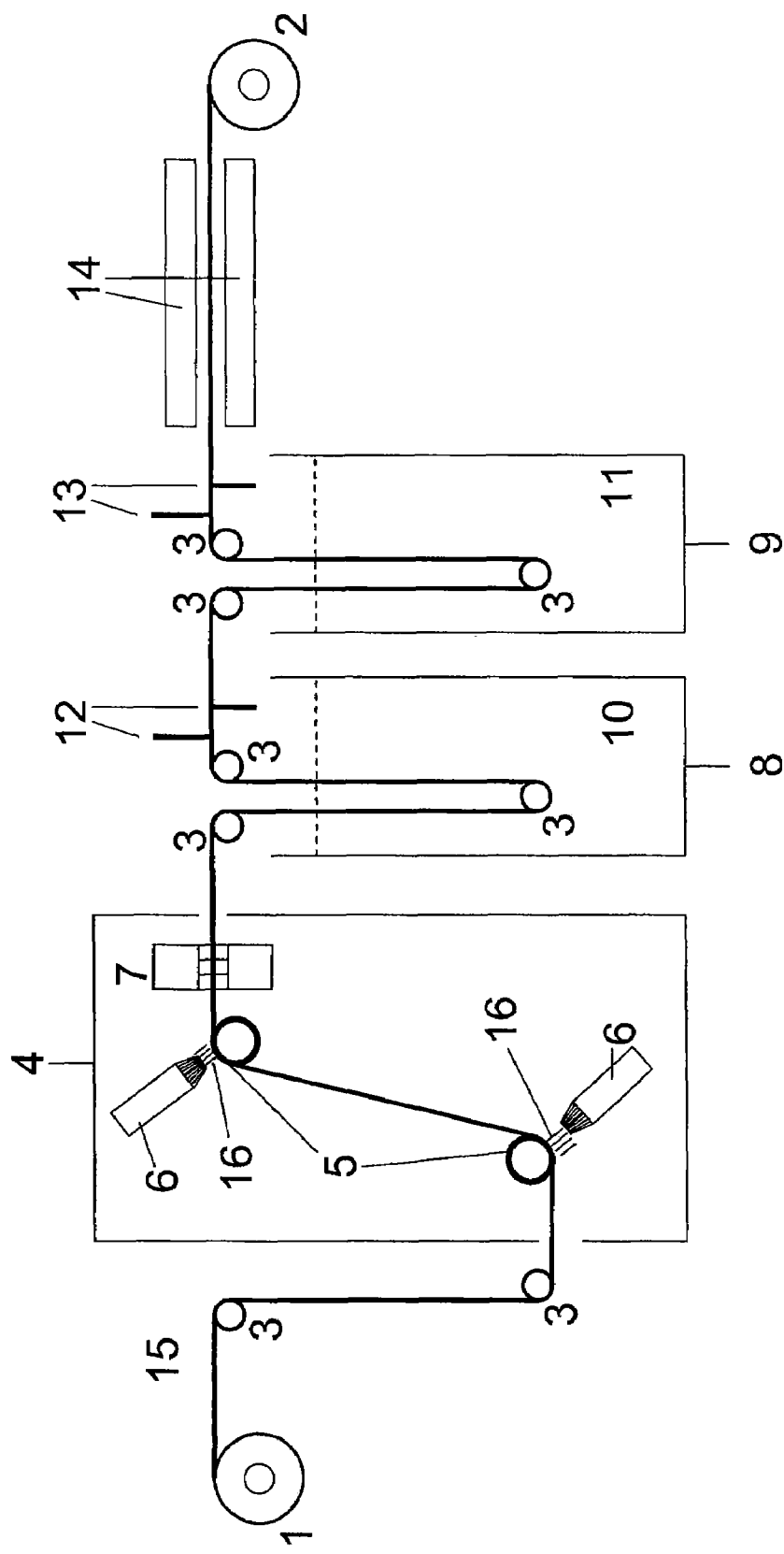
FIG. 2 depicts one embodiment of a production process incorporating the method of the present invention.

One possible embodiment for the process for making the foil may be as described in FIG. 2. A long, continuous piece of the valve metal foil 15 is unwound from a source roll 1, placed at the beginning of an automated machine, onto a series of guide rollers 3 until it rewinds onto a take-up roll 2. Take-up roll 2 is turned by a motor (not depicted) to pull valve metal foil 15 through the stations of the machine.

After unwinding from source roll 1, valve metal foil 15 enters a bead blasting box 4. A bead blasting box or sand blasting box is a term generally used to refer to any enclosure in which an abrasive agent is sprayed upon a surface of an object to remove a coating such as paint or rust through abrasion. Likewise, bead blasting or sand blasting are terms commonly used to refer to the action of spraying an object with any abrasive agent. In bead blasting box 4, valve metal foil 15 rolls across two hardened backing rollers 5. Hardened backing rollers 5 target valve metal foil 15 under two bead blasting nozzles 6 and also serve as a backing material to support valve metal foil 15 as it is abraded by TiN powder 16 sprayed from bead blasting nozzles 6. Each of the two bead blasting nozzles 6 is aimed such that TiN powder 16 emitted from bead blasting nozzles 6 contacts valve metal foil 15 on the side opposite hardened backing roller 5 when valve metal foil 15 is in contact with hardened backing rollers 5. Before leaving bead blasting box 4, valve metal foil 15 passes through a cleaning station that removes excess TiN powder from the surfaces of the valve metal foil. In FIG. 2, a pair of stationary bristles 7 is depicted at a cleaning station for mechanically cleaning valve metal foil 15. The cleaning station is not limited to stationary bristles and can include other cleaning devices know to one of ordinary skill in the art such as a rotating wheel brush or a jet of compressed air.

After leaving bead blasting cabinet 4, valve metal foil 15 follows a series of guide rollers 3 and enters a deionized water tank 8. Valve metal foil 15 is pulled into deionized water 10 and back out. The deionized water may be contained in an ultrasonic tank to further remove loose TiN powder. The deionized water remaining on valve metal foil 15 is then wiped off the surface of valve metal foil 15 using a pair of rubber or plastic wipers 12, one for each of the two surfaces of valve metal foil 15. Wipers 12 may be oriented such that the deionized water remaining on the surface of valve metal foil 15 drops back into deionized water tank 8 or the deionized water from valve metal foil 15 may be collected in a separate device (not shown) for processing and reuse or disposal.

After leaving deionized water tank 8, valve metal foil 15 follows a series of guide rollers 3 and enters a solvent tank 9. Valve metal foil 15 is pulled into solvent 11 and back out. The solvent remaining on valve metal foil 15 is then wiped off the surface of valve metal foil 15 using a pair of rubber or plastic (or other material not susceptible to the solvent) wipers 13, one for each of the two surfaces of valve metal foil 15. The wipers may be oriented such that the solvent remaining on the surface of valve metal foil 15 drops back into solvent tank 9 or the solvent from valve metal foil 15 may be collected in a separate device (not shown) for processing and reuse or disposal.

After leaving solvent tank 9, valve metal foil 15 enters an air drying tunnel 14, in which high pressure air is blown across valve metal foil 15. The high pressure air removes most residual moisture solvent and deionized water that may still remain on the surface of valve metal foil 15.

After exiting air drying tunnel 14, valve metal foil 15 is collected on to take-up roll 2. Valve metal foil 15 can be removed from take-up roll 2 at a later time to be cut and shaped for use in an electrolytic capacitor.

The process of abrading the surface of the valve metal foil with TiN powder is explained in greater detail below. The metal foil from which the cathode is made is a valve metal: preferably, aluminum, titanium, niobium, silicon, or tantalum. The metal foil can range in thickness from 5 $\mu$m to 110 $\mu$m with a preferred range of 10 $\mu$m to 30 $\mu$m. However, extremely thin foil is fragile and difficult to handle. Therefore, a narrower range of foil thicknesses from 10 $\mu$m to 30 $\mu$m is optimal.

The TiN powder used to abrade the foil should be around 99.95% purity. The powder can be as fine as 5 μm (2500 mesh) or as course as 100 μm (~140 mesh). However, powder granule sizes between 10 μm (1250 mesh) and 50 μm (~270 mesh) are preferred. The powder, prior to use in the bead blasting box, should be dried in a vacuum oven, preferably at a temperature between 60 degrees Celsius and 150 degrees Celsius. The dried TiN powder is placed in the bead blasting cabinet for use in an air nozzle. The air nozzle can operate with ordinary shop air at air pressures as low as 10 psi to as high as 100 psi. If the air pressure is set too low, the TiN powder will not mechanically alloy to the surface of the valve metal foil. If the pressure is set too high, then the TiN powder may possibly cause the foil to disintegrate. Air supply pressures between 20 psi and 60 psi are optimal.

In one embodiment, in the bead blasting box, there are two air nozzle locations. One nozzle is located and oriented to abrade one surface of the valve metal foil. The second nozzle is located and oriented to abrade the opposite surface of the valve metal foil. Depending on the width of the foil strip, more than one nozzle may be required at each of the two locations. The foil should be supported on the side opposite that which is currently being abraded with the TiN powder. The support can be a hardened roller, as shown in FIG. 2, or a flat metal plate across which the foil slides. The support will minimize the strain on the foil and also prevent the foil from twisting in the jet of pressurized air. The speed with which the foil moves is dependent upon the coverage area of the bead blast nozzle. Every region of the foil should receive a few seconds of exposure to the high pressure jet of TiN powder. A speed of 2 to 3 cm/sec should provide each region of the foil with adequate abrasion time under the bead blasting nozzle. Depending upon the width of the foil, multiple nozzles may be required at each of the two nozzle locations.

While the valve metal foil is abraded with the TiN powder, a fine layer of powder will mechanically alloy to the surface of the foil. Residual TiN powder will remain caked on surface of the foil after the bead blasting process. It is desirable to remove that excess TiN powder for two reasons. First, the excess TiN powder may be reused in the bead blasting process. Second, the excess TiN powder will degrade the performance of the capacitor. In one embodiment, the caked on TiN powder is removed by utilizing a brush or a series of brushes before the foil leaves the bead blasting box. The brushes may be stationary or the bristles of the brush may be arranged in a wheel and the wheel may spin, increasing the speed with which the bristles of the brush sweep along the surface of the foil. Alternatively, air pressure may be used to blast the excess powder from the surface. After the brushing or air-blasting process, the surface of the foil will be left with a thin, even layer of TiN powder mechanically alloyed on the surface.

After the TiN alloyed foil has been washed in the deionized water and solvent and then dried, it may be removed from the complete roll and cut for assembly into an electrolytic capacitor. The foil is then interleaved as a cathode between three or more high surface area anode foils.

A paper separator or other fiber with sufficient thickness and density, such as Kraft paper, manila, esparto or hemp, is used to prevent electrical contact between the anode and cathode. Also, different porous polymer sheets, such as porous polypropylene, could be used as well as ion conducting polymers to prevent electrical contact between the anode and cathode. An electrolytic capacitor stack according to the present invention consists of a number of units of: a cathode, a spacer, two or more anodes, a spacer and a cathode; with neighboring units sharing the cathode between them.

The preassembled capacitor is then vacuum impregnated with an electrically conductive electrolyte, by placing the capacitor in contact with the electrolyte and reducing the pressure to less than 50 mm Hg. The capacitor electrolyte is typically ethylene glycol based with a straight chain dicarboxlyic acid and/or boric acid, such as the electrolytes disclosed in U.S. Pat. Nos. 6,562,255 and 6,589,441, incorporated herein by reference. The electrolyte is neutralized with ammonia or an amine. A cathode depolarizer, typically a nitroaromatic compound such as nitrobenzene, nitroacetophenome, or nitroanisole, may be added to the electrolyte to improve the gas evolution behavior of the cathode, preferably and addition of 1% to 3% by weight cathode depolarizer. The capacitor is held at this low pressure for 5 to 45 minutes and then pressure is restored, using the pressure to force the electrolyte into the capacitor stack. The capacitor is then removed and placed in an oven at a temperature of about 65° C. to about 90° C. and a maximum oxygen atmospheric concentration of 2% for a period of about 2 hours to about 24 hours. The capacitor is then aged in a normal manner by applying the working voltage to the capacitor, allowing the capacitor to reach this voltage, and then allowing the current to decrease.

Electrolytic capacitors according to the present invention can be incorporated into implantable medical devices, such as implantable cardioverter defibrillators (ICDs), as would be apparent to one skilled in the art, as described in U.S. Pat. No. 5,522,851.

Having now generally described the invention, the same will be more readily understood through reference to the following example. The following example is illustrative, but not limiting, of the method of the present invention. Other suitable modifications and adaptations of the variety of conditions and parameters normally encountered and obvious to those skilled in the are within the spirit and scope of the invention.

EXAMPLE

Abraded titanium foil with mechanically alloyed TiN powder was manufactured according to the present invention in a lab environment. A piece of 12.5 μm thick titanium foil was taped to a solid metal plate and placed in a 15 gallon bead blasting cabinet. The bead blasting nozzle in the cabinet was filled with 99.95% TiN powder that had been dried in a vacuum oven at 70° C. The bead blasting nozzle was attached to the shop air supply and the pressure was set at 40 psi. The piece of titanium foil was abraded for about 10 seconds, during which the nozzle was moved across the surface of the foil in a helical pattern. After the abrasion process was complete, the titanium foil was removed from the bead blasting cabinet and detached from the solid metal plate.

The foil was then washed in deionized water. During the wash, the surface of the titanium foil was rubbed with a gloved finger to remove extra TiN powder that remained loosely attached to the surface of the foil. The foil was then rinsed in deionized water and then rinsed in acetone. After the foil dried, its capacitance properties were tested. The double layer capacitance increased to $120\,\mu F/cm^2$ from $20\,\mu F/cm^2$ for plain titanium foil. The anodic CV scan peak current, which accounts for pseudo-capacitance, was $250\,\mu A/cm^2$, as compared to $40\,\mu F/cm^2$ for a plain titanium foil. While the foil created in this lab process was not tested in an assembled electrolytic capacitor, these results predict improved cathode capacitance over plain metal foil cathodes.

While various embodiments have been described above, it should be understood that they have been presented by way of example only, and not limitation. Thus, the breadth and scope of this disclosure should not be limited by any of the above-described exemplary embodiments, but should be defined only in accordance with the following claims and their equivalents. Additionally, all references cited herein, including journal articles or abstracts, published or corresponding U.S. or foreign patent applications, issued U.S. or foreign patents, or any other references, are each entirely incorporated by reference herein, including all data, tables, figures, and text presented in the cited references.

The foregoing description of the specific embodiments will so fully reveal the general nature of the embodiments that others can, by applying knowledge within the skill of the art (including the contents of the references cited herein), readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A method for preparing a metal foil for use as a cathode in an electrolytic capacitor, comprising:
    abrading at least one surface of said metal foil with titanium nitride powder, wherein a portion of said titanium nitride powder mechanically alloys with said at least one surface of said metal foil.

2. The method of claim 1, wherein said foil is a valve metal.

3. The method of claim 2, wherein said foil is titanium.

4. The method of claim 1, wherein said titanium nitride powder is 325 mesh titanium nitride powder of 99.95% purity.

5. The method of claim 1, wherein said titanium nitride powder is delivered with compressed air in a range of 10 psi to 100 psi.

6. The method of claim 1, wherein said titanium nitride powder is applied to said at least one surface of said metal foil at a rate of 2.5 cm/sec.

7. The method of claim 1, further comprising cleaning said metal foil after abrading to remove loose titanium nitride powder.

8. The method of claim 7, wherein said cleaning step comprises first cleaning said metal foil in a bath of deionized water and then in a bath of solvent.

9. The method of claim 7, wherein said cleaning step comprises mechanically cleaning said metal foil.

10. A method for preparing a continuous metal foil tape for use as a cathode in an electrolytic capacitor, comprising:
    (a) feeding said metal foil tape into a bead blasting box; and
    (b) abrading at least one surface of said metal foil tape with titanium nitride powder delivered from a bead blasting nozzle located within said bead blasting box, wherein a portion of said titanium nitride powder mechanically alloys with said at least one surface of said metal foil.

11. The method of claim 10, further comprising:
    (c) removing excess titanium nitride powder from said at least one surface of said metal foil tape after said abrading step.

12. The method of claim 10, wherein said metal foil tape is titanium.

13. The method of claim 10, wherein said titanium nitride powder is 325 mesh powder of 99.95% purity.

14. The method of claim 10, wherein said titanium nitride powder is delivered with compressed air in a range of 10 psi to 100 psi.

15. The method of claim 10, wherein said metal foil tape is fed into said bead blasting box at a rate of 2.5 cm/sec.

16. The method of claim 10, wherein said abrading step comprises abrading a first surface of said metal foil tape with titanium nitride powder delivered from a first bead blasting nozzle located within said bead blasting box and abrading a second surface of said metal foil tape with titanium nitride powder delivered from a second bead blasting nozzle located within said bead blasting box.

17. The method of claim 11, wherein said step of removing excess titanium nitride powder from said at least one surface of said metal foil tape comprises cleaning said metal foil tape in a deionized water tank, wherein said deionized water tank is vibrated at ultrasonic frequencies to remove loose TiN powder from said at least one surface of said metal foil tape.

18. A method of assembling a flat electrolytic capacitor, comprising:
    (a) abrading at least one surface of a metal cathode foil with titanium nitride powder, wherein a portion of said titanium nitride powder mechanically alloys with said at least one surface of said metal cathode foil;
    (b) interleaving said abraded metal cathode foil with a separator material and a poly-anode stack such that a multiple anode stacked capacitor configuration is formed, wherein said separator material prevents electrical contact between said abraded metal cathode and said poly-anode stack; and
    (c) impregnating said multiple anode stacked capacitor configuration with a solvent-based electrolyte.

19. The method of claim 18, wherein said metal cathode foil is a valve metal.

20. The method of claim 18, wherein said poly-anode stack comprises at least two anodes.

* * * * *